(12) United States Patent
Sakamoto et al.

(10) Patent No.: US 6,183,142 B1
(45) Date of Patent: Feb. 6, 2001

(54) SINGLE LENS REFLEX CAMERA

(75) Inventors: Takamasa Sakamoto, Sakai; Junichi Tanii, Izumi, both of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/267,382

(22) Filed: Mar. 15, 1999

(30) Foreign Application Priority Data

Mar. 17, 1998 (JP) ................................................ 10-067178

(51) Int. Cl.$^7$ .................................................. G03B 19/12
(52) U.S. Cl. ............................................ 396/358; 359/876
(58) Field of Search .................................. 396/354, 358; 359/872–877

(56) References Cited

U.S. PATENT DOCUMENTS

| | | | |
|---|---|---|---|
| 4,110,765 | 8/1978 | Miyata et al. ........................... | 354/59 |
| 4,293,209 | 10/1981 | Kurei .................................... | 354/153 |
| 4,348,088 | * 9/1982 | Yamamichi et al. ................. | 396/358 |
| 4,431,285 | 2/1984 | Kajita et al. ......................... | 354/405 |

* cited by examiner

Primary Examiner—Alan A. Mathews
(74) Attorney, Agent, or Firm—Burns, Doane, Swecker & Mathis, LLP

(57) ABSTRACT

A mirror device for a camera. The mirror device includes a main mirror that directs luminous flux entering the photographic optical path of the camera to a position outside of the photographic optical path. A sub-mirror directs luminous flux passing through a half-mirror forming part of the main mirror to a rangefinding optical unit. The main mirror and the sub-mirror are retractable to outside the photographic optical path. A sub-mirror holder holds the sub-mirror, and is supported by a body of the mirror device so as to be retractable.

18 Claims, 5 Drawing Sheets and 4B is provided to drive the sub-mirror 20.
SINGLE LENS REFLEX CAMERA

CROSS-REFERENCED APPLICATIONS

This application is based on Application No. HEI 10-67178 filed in Japan, the content of which is hereby incorporated by reference.

BACKGROUND OF THE INVENTION

1. Field of the Invention

The present invention relates to a mirror device for a single lens reflex camera.

2. Description of the Related Art

FIGS. 1A and 1B are center section views of a conventional single lens reflex camera with the photographic lens removed. In general, the mirror device of a single lens reflex camera is moved as indicated in FIGS. 1A and 1B in accordance with the operating state.

The mirror arrangement shown in FIG. 1A pertains to the state in preparation for optical exposure. A main mirror 10 directs the optical path of the photographic frame to a pentagonal prism 2 to allow the photographer to view the photographic frame through a finder 3. At the same time, the luminous flux of the rangefinder area passes through the half mirror part of the main mirror 10, and is directed to a rangefinder unit 4 via a sub-mirror 20. Rangefinding calculations are executed based on the output of the rangefinding unit 4.

On the other hand, the mirror disposition during optical exposure is shown in FIG. 1B. When the main mirror 10 and the sub-mirror 20 are rotated upward to the retracted state outside the photographic optical path, exposure control is executed by a shutter 5, so as to optically expose the photographic frame on a film 6. At this time, the main mirror 10 is retracted to the pentagonal prism 2 side, and the sub-mirror 20 is retracted to a position covering the half-mirror area corresponding to the rangefinder area of the main mirror 10, so as to prevent inverse incidence of light from the finder 3 into the optical exposure path.

The main mirror 10 and the sub-mirror 20 rotate via the operation illustrated in FIG. 2. That is, a mirror holder 12 which supports the main mirror 10 is itself supported on a support shaft 8 so as to be rotatable relative to a mirror box, and move in rotation between the exposure preparation position A and the exposure position B indicated by arrow 92. A sub-mirror holder 22 which supports the sub-mirror 20 is itself supported by a hinge 14 so as to be rotatable relative to the main mirror holder 12, and move between the exposure preparation position A and the exposure position B via the hinge 14 together with the main mirror holder 12, and rotates about the hinge 14 to the main mirror holder 12 side at the exposure position B.

A mirror drive mechanism such as, for example, the mechanism shown in FIGS. 3A and 3B is provided at the side of the mirror box to operate the main mirror 10 in the aforesaid manner.

When the main mirror 10 is set at the exposure preparation position, i.e., when the mirror is in the down position show in FIG. 3A, an overcharge spring 34 supported on a mirror drive lever 33 presses down on the drive portion 16 of the main mirror holder 12, such that a force is exerted on the main mirror holder 12 in the mirror down direction (counter clockwise direction in the drawing) until the main mirror holder 12 is stopped by a stopper not shown in the drawing so as to be maintained in the exposure preparation position. Although the mirror drive lever 33 pivots about a support shaft 33s in the mirror up direction via a mirror drive spring 35, this pivoting is regulated by a mirror charge lever 36.

When the main mirror 10 is set at the exposure position, i.e., set in the up position, shown in FIG. 3B, the mirror charge lever 36 is released and moved downward, and the mirror drive lever 33 is rotated in a counterclockwise direction in the drawing via a mirror drive spring 35. At this time, the contact portion 33a of the mirror drive lever 33 presses upward on the drive portion 16 of the main mirror holder 12 so as to lift the mirror.

A mirror drive mechanism such as that shown in FIGS. 4A and 4B is provided to drive the sub-mirror 20.

When the set at the exposure preparation position, i.e., when set in the mirror down position shown in FIG. 4A, a sub-mirror holder 22 supporting the sub-mirror 20 is rotated about a hinge 14 which functions as a rotating shaft relative to the main mirror holder 12, such that the sub-mirror holder 22 is positioned so as to be open relative to the main mirror holder 12. One end of a sub-mirror drive spring 15 is attached to connector 22a of the sub-mirror holder 22, and the other end is attached to a connector 12a of the main mirror holder 12. The movement of the sub-mirror holder 22 is regulated a guide shaft 9 fixedly attached to the mirror box. The sub-mirror drive spring 15 exerts a force on the sub-mirror 20 in a counterclockwise direction in the drawing, until the sub-mirror holder 22 is stopped by a stopper not shown in the illustration.

When the sub-mirror 20 is set at the exposure position, i.e., set in the mirror up position as shown in FIG. 4B, the sub-mirror holder 22 is guided by the guide shaft 9 of the mirror box to the position shown in the drawing. The sub-mirror drive spring 15 exerts a force on the sub-mirror 20 in a clockwise direction in the drawing, so as to be folded outside the photographic optical path together with the main mirror holder 12.

As shown in FIG. 6, the respective exposure preparation positions of the main mirror 10 and the sub-mirror 20 are adjustable via the stoppers 18 and 28 provided in the mirror box. That is, a main mirror stopper 18 contacts the main mirror holder 12 which supports the main mirror 10. The main mirror stopper 18 is an eccentric pin, which allows adjustment of the stopper position, i.e., the rotation angle, of the main mirror holder 12 by rotating the main mirror stopper 18. A sub-mirror stopper 28 contacts the sub-mirror holder 22 which supports the sub-mirror 20, and this stopper 28 is also an eccentric pin which allows adjustment in the same manner as described above.

In mirror devices of the aforesaid conventional construction, when the main mirror holder 12 is moved via adjustment by the main mirror stopper 18, the angle of the sub-mirror also changes simultaneously therewith due to the movement of the hinge 14 functioning as the rotational axis of the sub-mirror holder 22 provided on the main mirror holder 12. Furthermore, since the sub-mirror 20 is maintained relative to the mirror box by sub-mirror holder 22 through the main mirror holder 12, there is a wide variation in the position of the sub-mirror 20 due to cumulative component errors. For this reason a complex adjustment mechanism is required to obtain the necessary positional adjustment operation for the sub-mirror 20. Furthermore, after the position has been adjusted, the position (3-axis) of the rangefinding unit 4 must be adjusted, as indicated by arrows 90 and 91 in FIG. 1A.

SUMMARY OF THE INVENTION

An object of the present invention is to provide a mirror device for a single lens reflex camera which does not produce positional dislocation of the sub-mirror when the position of the main mirror is adjusted.

The present invention relates to a mirror device having a main mirror for directing luminous flux entering the photographic optical path to the outside of the photographic optical path, and a sub-mirror for directing luminous flux passing through a half-mirror forming part of the main mirror to a rangefinding optical unit. The main mirror and the sub-mirror are retractable to outside the photographic optical path. A sub-mirror holder which holds the sub-mirror is supported by a body of the device so as to be rotatable.

The mirror device for a single lens reflex camera may include a main mirror for directing luminous flux entering the photographic optical path to the outside of the photographic optical path, and a sub-mirror for directing luminous flux passing through a half-mirror forming part of the main mirror to a rangefinding optical unit. A retraction drive mechanism drives both a main mirror holder supporting the main mirror and a sub-mirror holder supporting the sub-mirror in linkage so as to retract both mirror holders from the photographic optical path. The main mirror holder and the sub-mirror holder are respectively supported by the device body so as to be rotatable. The retraction drive mechanism drives the main mirror holder and the sub-mirror Holder in a loose linkage, and the position of the main mirror is independently adjustable within the range of this looseness.

It is desirable that, when the sub-mirror is retracted outside the photographic optical path, the rotation angle exceeds twice the rotation angle of the main mirror when the main mirror holder is retracted from the photographic optical path.

It is further desirable that the sub-mirror holder is driven in rotation by a gear mechanism, and that the support shaft of the sub-mirror holder is arranged on the subject side from the reflecting surface of the main mirror.

It is also desirable that a camera or lens mount is provided on a device body member supporting the sub-mirror holder.

These and other objects advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The mirror device of an embodiment of the present invention shown in FIGS. 5A, 5B, 7, and 8–10 is described in detail hereinafter.

Figure 7:
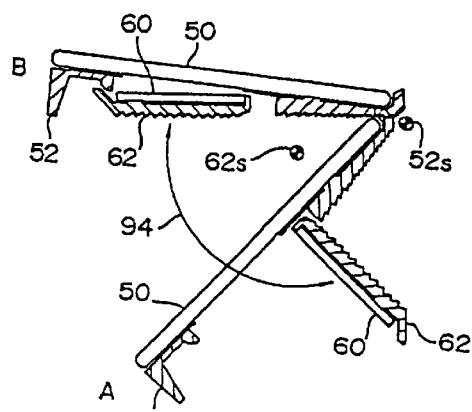
FIG. 7 illustrates the operation of the mirror device according to one embodiment of the present invention.
Figure 2:
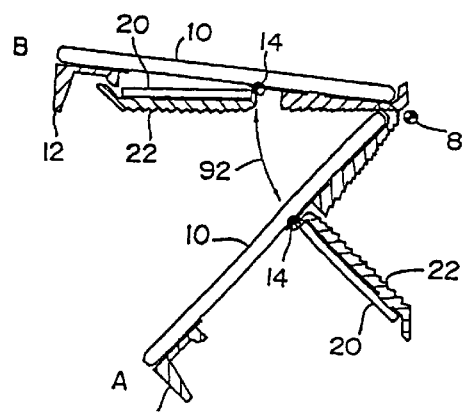
FIG. 2 illustrates the operation of a conventional mirror holder.
Figure 3A:
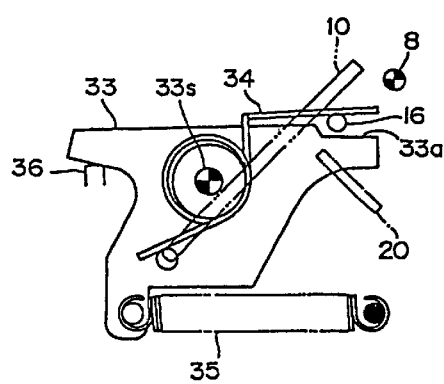
FIGS. 3A and 3B show the construction of a conventional main mirror drive mechanism.
Figure 3B:
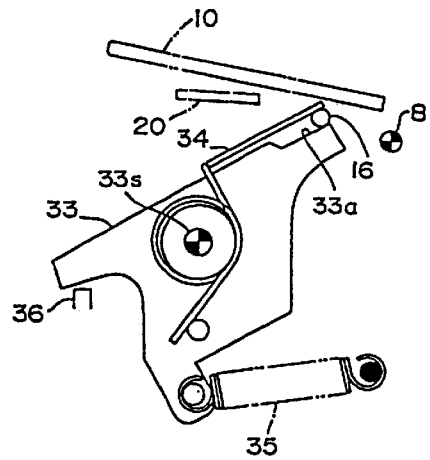
Figure 4A:
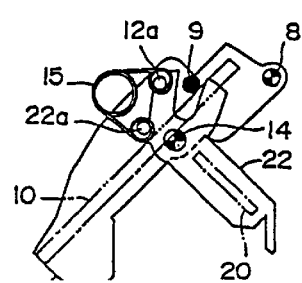
FIGS. 4A and 4B show the construction of a conventional sub-mirror drive mechanism.
Figure 4B:
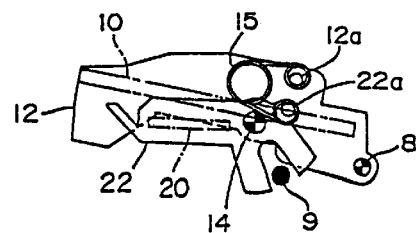

As shown in FIG. 7, the mirror device of the present invention has a main mirror 50, and a main mirror holder 52 supporting the main mirror 50, which rotates about a support shaft 52s relative to the mirror box 100 (see FIGS. 8–10), similar to the conventional mirror device shown in FIG. 2. A sub-mirror holder 62 which supports a sub-mirror 60 is, however, supported by a support shaft 62s so as to be rotatable relative to the mirror box 100, and moves between an exposure preparation position A and an exposure position B. Although the positional relationship of the main mirrors 50 and 10 and the sub-mirrors 60 and 20 shown in FIGS. 7 and 2 before movement and after movement are substantially similar, the axial support methods of sub-mirrors 60 and 20 are different.

In the conventional example of FIG. 2, the sub-mirror holder 22 which holds sub-mirror 20 is supported by main mirror holder 12 so as to be rotatable via hinge 14, whereas in the mirror device of one embodiment of the present invention shown in FIG. 7, the sub-mirror holder 62 which supports the sub-mirror 60 is directly supported by a support shaft 62s so as to be rotatable relative to the mirror box. Hence, the main mirror holder 52 rotates about a first stationary axis (support shaft 52s), and sub-mirror holder 62 rotates about a second stationary axis (support shaft 62s).

Figure 8:
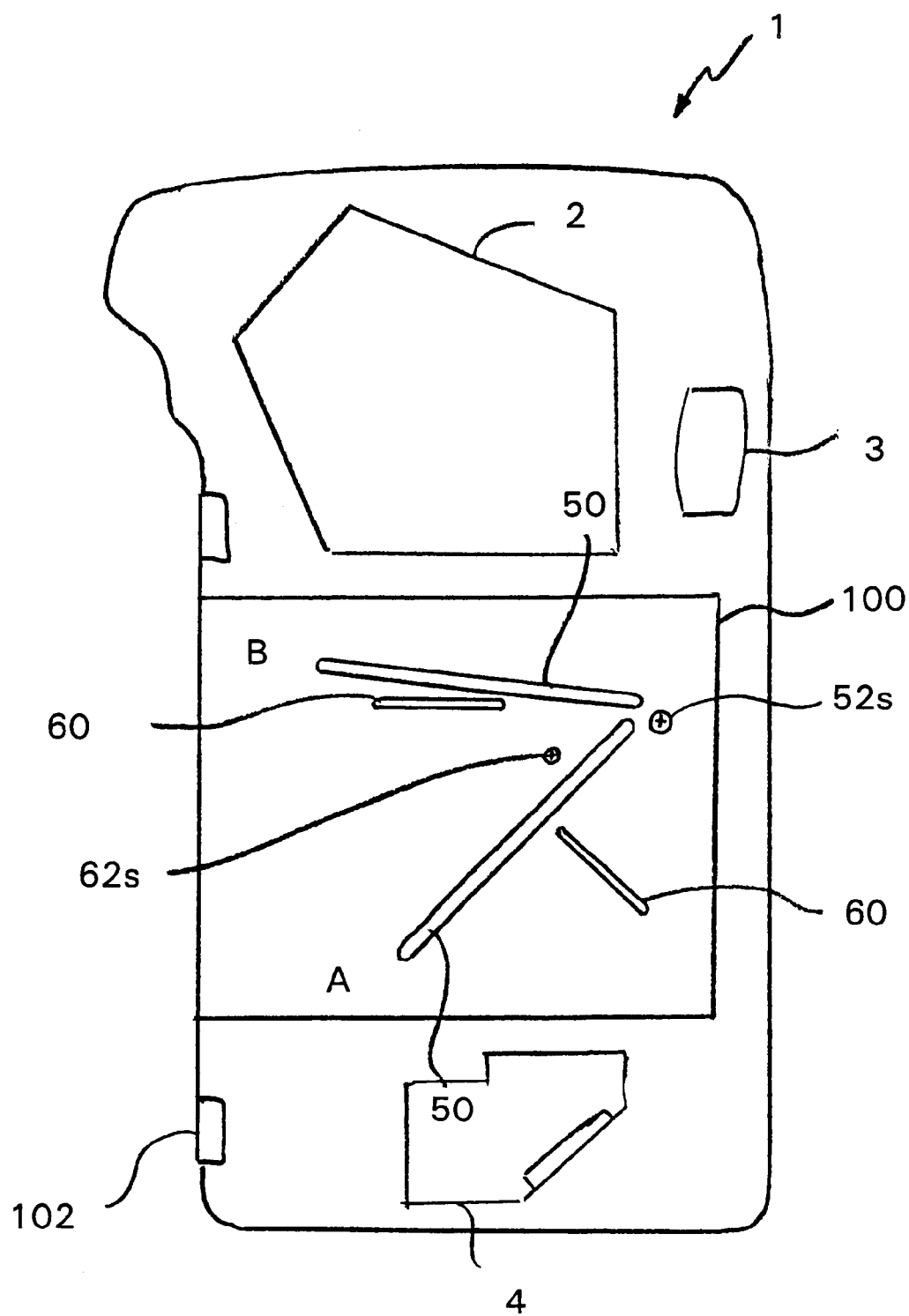
FIG. 8 illustrates an operational center section view of a camera having a mirror device according to one embodiment of the present invention.
Figure 9:
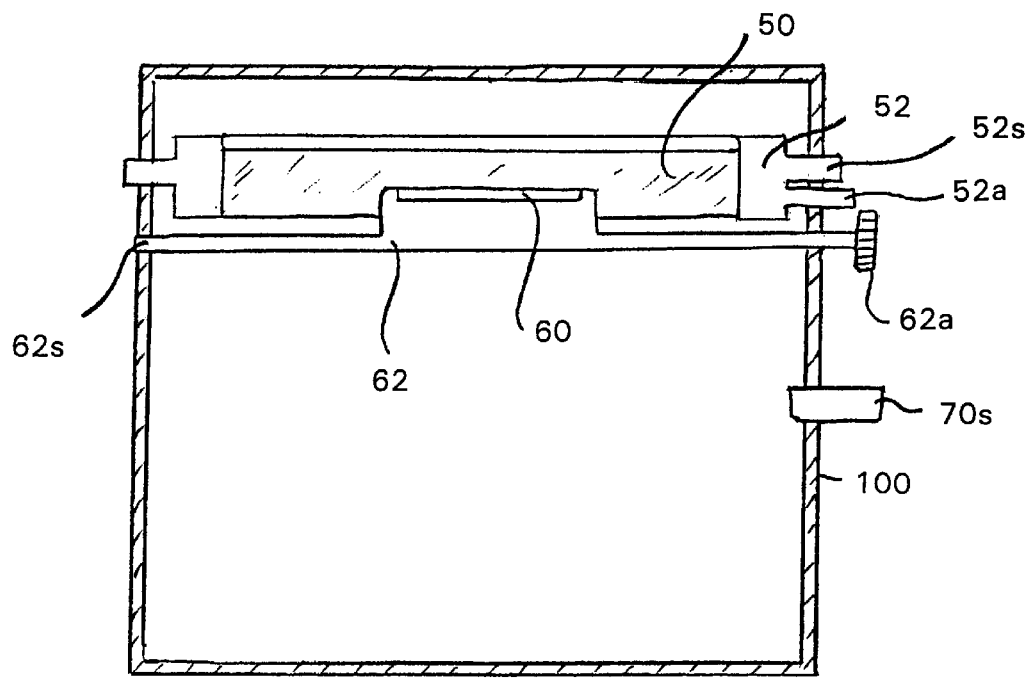
FIG. 9 illustrates an operational front view of a mirror device according to one embodiment of the present invention, where the main mirror and the sub-mirror are located in the retracted or exposure position.
Figure 10:
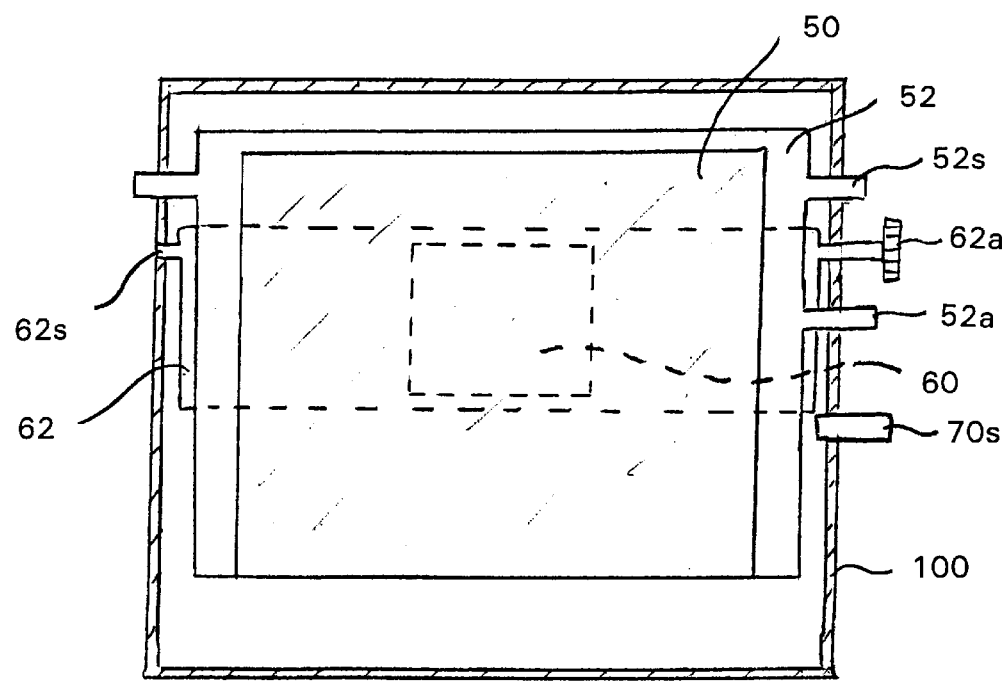
FIG. 10 illustrates an operational front view of a mirror device according to one embodiment of the present invention, where the main mirror and the sub-mirror are located in the unretracted or exposure preparation position.

FIG. 8 illustrates a camera 1 having the mirror device. The camera 1 includes the mirror box 100. As viewed from the side, the main mirror 50 and the sub-mirror 60 are rotatable relative to the mirror box 100 from the exposure preparation position A to the exposure position B. When the mirrors 50, 60 are located in the exposure position B, film (not illustrated) located rearward of the mirror box 100 may be exposed. The camera 100 also includes a lens mount 102 provided on the body of the device that supports the main mirror holder 52 and the sub-mirror holder 62. FIGS. 9 and 10 illustrate how the mirrors 50, 60 independently rotate relative to the mirror box 100, when the mirror box 100 is viewed from the lens mount side of the camera.

The main mirror holder 52 is mounted to the mirror box 100 via the support shaft 52s. The support shaft 52s may be integral with the main mirror holder 52 or may be a separate member that is connected to the main mirror holder. The sub-mirror holder 62 is mounted to the mirror box 100 via the support shaft 62s. The support shaft 62s may be integral with the sub-mirror holder 62 or may be a separate member that is connected to the sub-mirror holder. The support shaft 52s is spaced from the support shaft 62s, and is independently mounted to the mirror box 100. Thus, rotation of the main mirror holder 52 does not cause the support shaft 62s to change position with respect to the support shaft 52s.

FIG. 9 illustrates the mirrors 50, 60 in their respective retracted positions, where the mirrors 50, 60 permit luminous flux to expose a photographic frame on a film. FIG. 10 illustrates the mirrors 50, 60 in their respective unretracted positions, where the main mirror 50 directs the optical path of a photographic frame to another area, such as upward to the pentagonal prism 2 and finder 3. At the same time, the luminous flux passes through the half mirror part of the main mirror 50, where it is directed to another area by the sub-mirror 60. For example, the sub-mirror 60 can direct the luminous flux downward to a rangefinder unit 4.

Figure 5A:
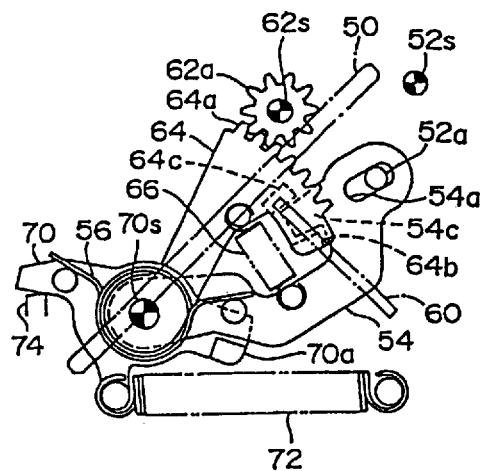
FIGS. 5A and 5B show the construction of the mirror drive mechanism of an embodiment of the present invention.
Figure 5B:
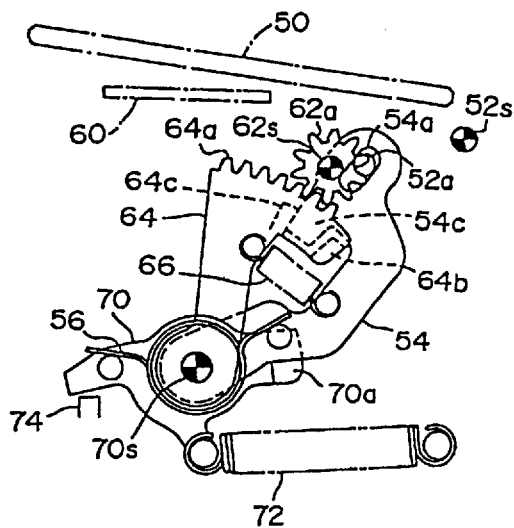
Figure 6:
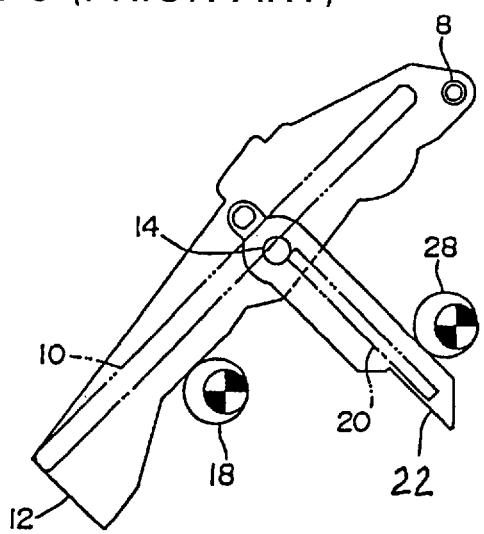
FIG. 6 illustrates conventional mirror adjustment.

The main mirror 50 and the sub-mirror 60 are driven by a mirror drive mechanism provided on the side of the mirror box 100 as shown in FIGS. 5A and 5B.

The mirror drive mechanism comprises a main mirror drive lever 54 for driving the main mirror holder 52, a sub-mirror drive lever 64 for driving the gears of the sub-mirror holder 62, and a mirror lifting lever 70 for driving both drive levers 54 and 64. The respective levers 54, 64, 70 are supported on the support shaft 70s provided on the mirror box such that these levers are respectively rotatable on the same axis.

A mirror driving spring 72 exerts a force on mirror lifting lever 70 in the mirror up position, i.e., a counterclockwise direction, and the rotation is regulated by a mirror charge lever 74. The mirror lifting lever 70 is provided with a contact area 70a which contacts the main mirror drive lever 54. A force is exerted on the main mirror drive lever 54 to the contact area 70a of the mirror lifting lever 70 via an over-charge spring 56. The ends of over-charge spring 56 are respectively connected to the mirror lifting lever 70 and the main mirror drive lever 54, such that when the mirror lifting lever 70 is rotated, the main mirror drive lever 54 is also rotated about the axis 70s.

A connection projection 54c which protrudes to the interior side in the diameter direction is provided on the tip of the main mirror drive lever 54, and fits loosely between a pair of connection projections 64b and 64c provided on the tips of the sub-mirror drive lever 64, such that the main mirror drive lever 54 and the sub-mirror drive lever 64 rotate together with looseness. Both drive levers 54 and 64 are caused to approach one another via a force exerted by another over-charge spring 66.

A connection hole 54a is provided on the tip of the main mirror drive lever 54 to connect with the drive projection 52a provided on the main mirror holder 52, such that when the main drive lever 54 is rotated, the main drive holder 52 rotates about the support shaft 52s via this connection, and the main mirror 50 is lowered from the position shown in FIG. 5B to the position shown in FIG. 5A. The mirror box 100 can include a groove or slot along which the drive projection 52a traverses when it is moved by the action of the main drive lever 54.

An exterior gear 64a is provided at the tip of the sub-mirror drive lever 64. The sub-mirror holder 62 is provided with a gear unit 62a on the same axis as support shaft 62s. The exterior gear 64a of the sub-mirror drive lever 64 engages the gear unit 62a of the sub-mirror holder 62, such that when the sub-mirror drive lever 64 is rotated, the sub-mirror holder 62 is rotated about the support shaft 62s and the sub-mirror 60 is lowered from the position shown in FIG. 5B to the position shown in FIG. 5A.

The operation of the drive mechanism is described below.

As shown in FIG. 5, when the mirror is down, the mirror charge lever 74 contacts the mirror lifting lever 70, and the mirror lifting lever 70 rotates in a clockwise direction to charge the mirror drive spring 72. A downward force lowering the mirror is exerted on the main mirror drive lever 54 by the over-charge spring 56 which exerts a force causing the main mirror drive lever 54 and the mirror lifting lever 70 to mutually approach one another, such that the main mirror drive lever 54 rotates with the mirror charge lever 70 in a clockwise direction until stopped by a stopper not shown in the drawing, and at which position the main mirror drive lever 54 is held by the exerted force.

The connection hole 54a of the main mirror drive lever 54 is lowered to the drive projection 52a of the main mirror holder 52, thereby causing the main mirror holder 52 to rotate about the support shaft 52s in a counterclockwise direction so as to lower the main mirror 50.

When the main mirror drive lever 54 is rotated in a clockwise direction, the sub-mirror drive lever 64 is rotated in a clockwise direction via the over-charge spring 66 which exerts a force in the mutual contact direction of the sub-mirror drive lever 64 and the main mirror drive lever 54 until stopped by a stopper not shown in the drawing, and the sub-mirror drive lever 64 is held in this position. When the sub-mirror drive lever 64 is rotated, the exterior gear 64a rotates the gear unit 62a of the sub-mirror holder 62, and the sub-mirror holder 62 is rotated in a counterclockwise direction about the support shaft 62s until it reaches the mirror down position. The sub-mirror over-charge spring 66 is necessary to absorb error between the stop position of the main mirror 50 and the stop position of the sub-mirror 60.

When the mirror is up as shown in FIG. 5B, the mirror charge lever 74 is released and moves downward, and the mirror lifting lever 70 is rotated in a counterclockwise direction via the force exerted by the charged mirror drive spring 72. The main mirror drive lever 54 presses against the contact area 70a of the mirror lifting lever 70, and is rotated in a counterclockwise direction together with the mirror lifting lever 70. At this time, the connection hole 54a of the main mirror drive lever 54 lifts the drive projection 52a of the main mirror holder 52, so as to rotate the main mirror holder 52 about the support shaft 52s in a clockwise direction, thereby moving the main mirror 50 upward and retracting the main mirror 50 from the photographic optical path.

The connection projection 54c of the main mirror drive lever 54 contacts the connection projection 64c of the sub-mirror drive lever 64, so as to lift the sub-mirror drive lever 64. In this way, the sub-mirror drive lever 64 is rotated in a counterclockwise direction, and the sub-mirror holder 62 is rotated in a clockwise direction about the support shaft 62s by the engagement of the exterior gear 64a of the sub-mirror drive lever 64 and the gear unit 62a of the sub-mirror holder 62, thereby moving the sub-mirror 60 upward so as to be retracted from the photographic optical path.

Although in the above-described mirror drive mechanism, the sub-mirror 60 is caused to move via rotation of a gear, the sub-mirror 60 may also be moved via other devices. For example, a cam or groove mechanism may cause the sub-mirror holder 62 to move from position A to position B. Likewise, the main mirror 50 may be moved by other devices besides the drive projection 52a and connection hole 54a. For example, the main mirror holder 52 may be caused to move by rotation of a gear located on the shaft 52s. Other rotation transmission linkages will also suffice to move the main mirror 50 and the sub-mirror 60.

As described above, the sub-mirror holder 62 is driven independently from the main mirror holder 52. The rotation of the main mirror holder 52 does not cause the axis of rotation of the sub-mirror holder 62 to change location because the sub-mirror holder 62 is not supported by the main mirror holder 52. Thus, the position of the sub-mirror 60 is not affected by the positional adjustment of the main mirror 50. Since the sub-mirror holder 62 is directly supported by the mirror box 100 and not through the main mirror holder 52, the cumulative component error is reduced relative to the sub-mirror 60. Therefore, positional adjustment of the sub-mirror 60 is unnecessary, and adjustment cost reduction, adjustment component elimination, and adjustment component space reduction can be accomplished, for example, by providing a pin that is integral with the mirror box as a stopper for the sub-mirror 60.

Figure 1A:
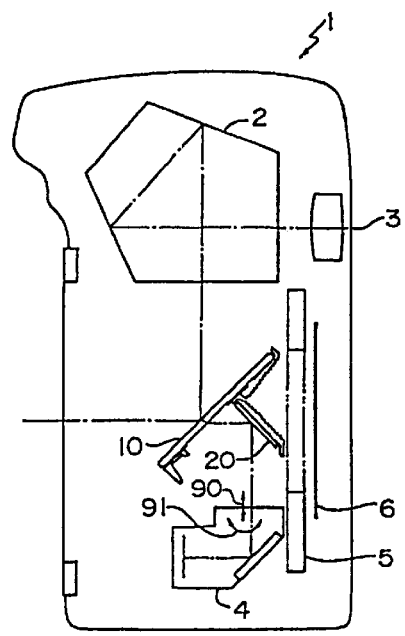
FIGS. 1A and 1B are center section views of a camera using a conventional mirror device.
Figure 1B:
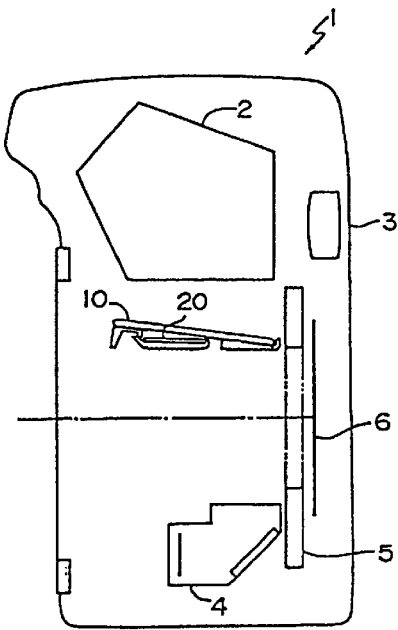

Since positional adjustment of the sub-mirror 60 is unnecessary, positional adjustment (3-axis adjustment) of the rangefinding unit (AF module) 4, conventionally performed as indicated by arrows 90 and 91 in FIG. 1A, may also be eliminated, thereby accomplishing adjustment cost reduction, adjustment component elimination, and adjustment component space reduction.

Furthermore, since the sub-mirror holder 62 completely rotates, a mechanism to suppress inertial force is readily constructed. That is, in a conventional mirror device, the movement of the sub-mirror holder is a complex movement comprising the composite rotational movement of the main mirror holder and the rotational movement about the hinge of the main mirror holder which makes counterbalancing difficult. In the mirror device of one embodiment of the present invention, the movement of the sub-mirror holder is a simple rotational movement which allows counterbalancing to suppress drive inertial force and drive shock of the sub-mirror holder. This is readily accomplished within the mirror drive mechanism in a manner similar to that of the main mirror holder.

In addition, if a camera or lens mount is provided on the device body member which supports the sub-mirror holder 62, the number of components can be greatly reduced between the photographic lens and the sub-mirror 60, thereby reducing the cumulative error of the sub-mirror position relative to the optical axis generated by cumulative component error, and assuring a suitable degree of precision even when positional adjustment of the sub-mirror 60 is eliminated.

The present invention is not limited to the previously described embodiment, and may be variously modified.

What is claimed is:

1. A mirror device for a camera, comprising:
   a main mirror for directing luminous flux entering the photographic optical path of the camera to a position outside of the photographic optical path;
   a sub-mirror for directing luminous flux passing through a half-mirror forming part of the main mirror to an optical unit, the main mirror and the sub-mirror being retractable to outside the photographic optical path;
   a sub-mirror holder that holds the sub-mirror, the sub-mirror holder being supported by a body of the mirror device so as to be retractable; and
   a retraction mechanism that retracts the main mirror and the sub-mirror in the same direction.

2. The mirror device of claim 1, wherein the mirror device is located in a single lens reflex camera.

3. The mirror device of claim 1, further comprising a main mirror holder that supports the main mirror, and wherein the retraction mechanism drives both the main mirror holder and the sub-mirror holder so as to retract the mirror holders from the photographic optical path.

4. The mirror device of claim 3, wherein the main mirror holder and the sub-mirror holder are respectively rotatably supported by the body of the mirror device.

5. The mirror device of claim 1, wherein the sub-mirror holder is supported by the body of the mirror device at a first location, further comprising a main mirror holder that holds the main mirror, the main mirror holder being supported by the body of the mirror device so as to be retractable, the main mirror holder being supported by the body of the mirror device at a second location.

6. The mirror device of claim 1, wherein the main mirror and the sub-mirror are rotatably retractable to outside the photographic optical path, the rotation angle of the sub-mirror being twice the rotation angle of the main mirror when the main mirror and the sub-mirror are rotatably retracted to outside the photographic optical path.

7. The mirror device of claim 1, further comprising a gear mechanism for retracting the main mirror and the sub-mirror to outside the photographic optical path.

8. The mirror device of claim 1, wherein the sub-mirror holder includes a support shaft mounted to the body of the mirror device, the support shaft of the sub-mirror holder being arranged on a subject side of a reflecting surface of the main mirror when the main mirror is in an unretracted position.

9. The mirror device of claim 1, wherein the mirror device is located in a camera, further comprising a lens mount provided on the body of the device that supports the sub-mirror holder.

10. The mirror device of claim 1, wherein the sub-mirror covers the half-mirror forming part of the main mirror in the retracted position.

11. A mirror device for a camera, comprising:
    a first mirror, at least a portion of the first mirror being a half-mirror, the first mirror for reflecting light toward a side of the camera and for passing the light through the half-mirror to a second mirror, the first mirror being rotatable about a first shaft mounted to a body, the second mirror being rotatable about a second shaft mounted to the body, the first shaft being spaced from the second shaft; and
    means for retracting the first mirror and the second mirror in the same direction.

12. The mirror device of claim 11, wherein the body includes a mirror box.

13. The mirror device of claim 11, further comprising a first mirror holder for holding the first mirror and a second mirror holder for holding the second mirror, the first mirror holder including the first shaft, and the second mirror holder including the second shaft.

14. The mirror device of claim 11, in combination with a camera, the first mirror directing luminous flux entering the photographic optical path of the camera to a position outside of the photographic optical path, the second mirror for directing luminous flux passing through the half-mirror to an optical unit of the camera, the first mirror and the second mirror being rotatable to positions outside the photographic optical path.

15. The mirror device of claim 11, further comprising a first mirror holder that holds the first mirror and a second mirror holder that holds the second mirror, the first mirror holder including the first shaft and a drive projection, the second mirror holder including the second shaft and a gear.

16. The mirror device of claim 15, further comprising a first drive lever mounted to the body, the first drive lever for causing the drive projection to move such that the first mirror rotates.

17. The mirror device of claim 16, further comprising a second drive lever mounted to the body, the second drive lever having a gear for causing the gear of the second mirror holder to rotate such that the second mirror rotates.

18. The mirror device of claim 11, wherein the second mirror covers the half-mirror portion of the first mirror in the retracted position.

* * * * *